_United States Patent Office_

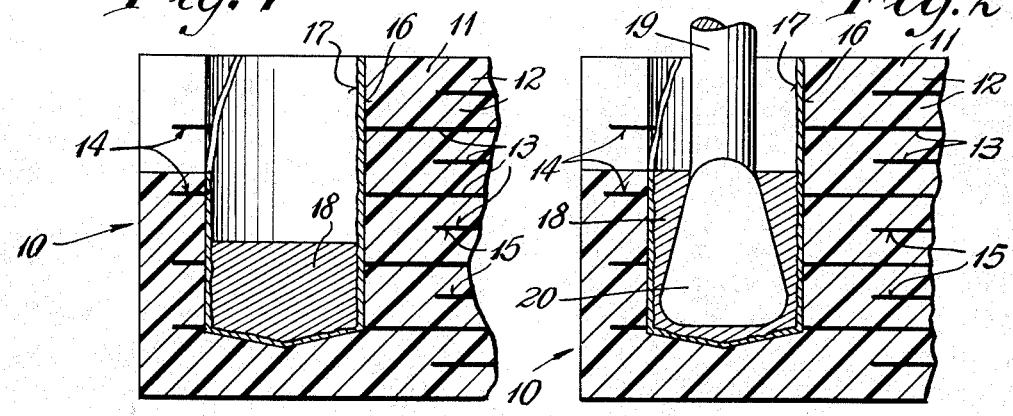

3,260,907
Patented July 12, 1966

3,260,907
ELECTRICAL UNIT AND TERMINAL LEAD
CONNECTION THEREFOR
Barton L. Weller, Monroe, and Edmund A. Bolton, Easton, Conn., assignors to Vitramon, Incorporated, Monroe, Conn., a corporation of Delaware
Original application June 19, 1962, Ser. No. 203,600. Divided and this application Sept. 26, 1963, Ser. No. 311,736
7 Claims. (Cl. 317—261)

This application is a division of our co-pending application Serial No. 203,600, filed June 19, 1962.

This invention relates to terminal lead connections for electrical units. More specifically, it constitutes an improvement on the terminal lead connection disclosed in the U.S. patent of Barton L. Weller, No. 3,021,589.

In the aforesaid patent a terminal lead connection for an electrical unit having a substantially rigid moonlithic body formed of superposed, substantially parallel layers of material having specific electrical characteristics, including at least one electrically conductive layer lying wholly within the body is disclosed wherein the terminal lead extends into the body transversely of the layers so that it has electrical connection with the electrically conductive layer, the lead being gripped by the body which is shrunk thereon during the final curing of the body.

According to the invention of the said patent, the lead is received in a recess formed in the body, extending at least through the electrically conductive layer thereof, which is initially of a diameter sufficient to receive the lead, yet is small enough to enable the body to shrink into gripping engagement therewith. The lead has electrical connection with the electrically conductive layer exposed by the recess and, while such connection might constitute direct engagement of the lead and the electrically conductive layer, in the preferred form an electrically conductive lining on the wall of the recess is engaged by the lead for connecting the lead to the electrically conductive layer. The lining, which is bonded to the electrically conductive layer and to the lead, in addition to forming the electrical connection between the two also functions, in units wherein the electrode comprises a plurality of plates or electrically conductive layers, to electrically tie the plates together to form the electrode.

While Patent No. 3,021,589 provides a terminal lead connection to an electrode, having a part thereof at least disposed wholly within the body of an electrical unit, a number of problems have been encountered which directly affect the reliability of the unit, such problems resulting from reduced mechanical strength and electrical continuity of the lead connection.

It has been found that high stresses, resulting from manipulation of the lead, exist at the juncture or interface of the relatively soft metal lead and the rigid body. These stresses, which are greater than the tensile strength of the malleable lead metal, tend to cause the lead to move and distort at the point of stress, such distortion resulting in a rupture of the electrical connection between the lead and the electrically conductive layer. The rupture, which may occur in the bond between the lead and the layer and/or between the lead and the electrically conductive lining, depending on the construction of the particular unit, is progressive, usually starting at the outermost point of bond and propagating downwardly into the recess with each subsequent stressing of the lead. Consequently, a terminal lead connection, which was originally mechanically strong and electrically reliable, under repeated stressing, will fail as a result of the inability of the bond to absorb the movement of the malleable lead and transmit it to the relatively rigid body of the unit.

The present invention overcomes the problems aforenoted and has as an important object thereof to provide a terminal lead connection in an electrical unit which includes a bond at the juncture of the relatively soft lead and rigid body that is capable of withstanding normal stressing of the lead without rupturing.

According to the invention, the aforesaid object is achieved by providing a cushion or malleable bond at the juncture of the lead and body, the bond having sufficient malleability to distribute the stress on the lead and spread it around its entire periphery, so that, at any given point, it is held below the tensile limits of the lead and lead to body interface area.

In one form of the invention the provision of the malleable bond is accomplished by forming the lead-receiving recess in the body of substantially greater diameter than the lead to be inserted therein so that a substantial thickness of shock absorbing bonding material can be disposed therearound for absorbing and distributing stresses.

It is also an object of the invention to provide a terminal lead connection in an electrical unit which includes means for distributing stress, resulting from manipulation of the lead, around the entire periphery of the lead in the interface area with the unit body so that at any given point in the interface area the stress does not surpass the tensile strength of the lead or the lead to body bond.

Another object of the invention is to provide a terminal lead connection having means for cushioning the bond or connection against rupture while maintaining electrical connection between the lead and the electrode that lies wholly within the body of the electrical unit.

Still another object of the invention is to provide a terminal lead connection in an electrical unit which includes a substantial thickness of shock absorbing bonding material between the lead and the body in the interface area, the bonding material being electrically conductive for electrically connecting the lead to the electrode of the unit while cushioning the juncture of the lead and body against rupture.

Still another object of the invention is to provide a terminal lead connection in an electrical unit between a relatively soft metal lead and rigid body which is electrically reliable, mechanically strong and free of areas of concentrated stress resulting from lead manipulation.

It is further an object of the invention to provide a capacitor unit, having a terminal lead connection according to the invention.

Other objects and advantages will be apparent from the specification and claims, when considered in connection with the attached sheet of drawings, illustrating one form of the invention, wherein like characters represent like parts and in which:

FIGURE 1 is a fragmentary elevational view, in section, of a capacitor unit in accordance with the invention and just prior to insertion of the lead therein;

FIG. 2 is the same as FIG. 1, but shows the lead in inserted position;

FIG. 3 is a fragmentary plan view of the capacitor unit of FIG. 2; and

FIGS. 4 through 7 are each fragmentary elevational views, in section, of a capacitor unit having a modified form of terminal lead connection according to the invention.

Referring now to the drawings for a more detailed description of the invention, in FIGS. 1 to 3 an electrical unit 10 is shown at various stages in the formation of the terminal lead connection according to the invention. While the concepts of the invention are applicable to capacitors, resistors, inductors and similar electrical devices having a porcelain, glass, ceramic or other substantially rigid monolithic body in which a part, at least, of the electrodes lie wholly within the body, in the herein illustrated form of the invention, for purposes of description, a capacitor of the type disclosed in U.S. Patent No. 3,021,589 is shown.

Reference may be made to the said patent for particular details of construction of the capacitor, however, for present purposes it is sufficient to note that it comprises a substantially rigid monolithic body 11 of superposed substantially parallel layers of dielectric material 12 and electrically conductive material 13, the latter forming the electrode plates of the unit and lying wholly within the body. While in some instances it may be desired to have additional electrode plates on the exterior of the body and connected to the interior plates, it is presently preferred and herein illustrated as having all of the electrode plates disposed wholly within the body.

The electrically conductive layers or plates 13 of body 11 are, as is well understood in the art, spaced by a layer or layers of the dielectric material 12 and so formed as to define two electrically distinct groups of electrode plates 14 and 15. The groups of electrode plates, which each form one electrode of the capacitor unit may be formed by any means known to the art, including relatively displacing adjacent plates so that alternate plates overlie one another or providing a cutout or the like at the opposite ends of adjacent plates so that the cutouts of alternate plates are in corresponding positions, to facilitate electrically connecting all of the plates of each group to form its respective electrode.

Heretofore, terminal lead connections have been made in the electrical unit 10 with each of the electrodes 14 and 15 of the unit by inserting a terminal lead means into the body for establishing electrical connection with its respective electrode and communicating it outwardly of the body. According to the prior art, insertion of the terminal lead means into the body is achieved by forming a recess in the body sufficient only to receive the lead so that on curing the body it is able to shrink into engagement with the lead for gripping the same. The lead in such prior art constructions had either direct electrical contact with the electrically conductive layer or layers of the body or had electrical connection therewith through an electrically conductive lining disposed on the wall of the recess. As will be readily understood, the electrically conductive lining, in addition to connecting the lead to its respective electrode, functioned to tie the plates forming the electrode together if required.

It has been found that terminal lead connections of the aforementioned type tended to rupture at the interface or bond between the lead and the body of the unit as the result of stresses due to manipulation of the lead. The stressing of the lead, which is soft and malleable relative to the rigid monolithic body of the device, overcomes the tensile strength of the lead and the bond, eventually rupturing the same and causing electrical and mechanical breakdown of the unit.

According to the present invention, this problem is overcome and a highly reliable terminal lead connection is formed by providing a cushion between the lead and the body for distributing the stresses entirely around the periphery of the lead so that at any given point the stress is no greater than the tensile strength of the lead or the interface bond.

In FIGS. 1 through 3 one method of providing the desired cushion is shown according to the invention. A recess 16, which is formed in a manner similar to that disclosed in the prior art, is provided. In the present invention, however, the recess, rather than being of a size only sufficient to receive the lead, is of substantially greater diameter than the lead to be inserted therein for receiving a shock absorbing bonding material between the inserted lead and the wall of the recess, as will be hereinafter described. While the diameter of the recess 16 in relation to the diameter of the lead may vary, depending on the tensile strength of the lead or interface bond, it has been found desirable to form the recess of a diameter approximately twice that of the lead, thereby enabling a cushion of the shock absorbing bonding material to be disposed between the lead and the wall of the recess equal to approximately the radius of the lead.

After the recess 16 has been formed it is lined with electrically conductive material 17, of any type and in any manner well known to the art, for electrically engaging all of the electrode plates exposed by the recess and tying them together to form one of the electrodes of the unit. Thereafter, the body is cured to harden the layers into a rigid monolithic body and secure the lining in position.

After the body has been cured, but not necessarily immediately thereafter, a quantity of silver or other electrically conductive solder 18, of any well known type, is inserted in the recess, as shown in FIG. 1. A lead 19, as shown in FIG. 2, is then inserted in the recess so that it is substantially centered and the solder flows therearound to form a shock absorbing cushion of substantial thickness between the lead and the wall of the recess. While the lead 19, within the concepts of the invention, may be circular or square in cross-section, or of any other configuration, in the form of the invention shown in FIGS. 1 to 3 the lead is spaded, as at 20, to prevent its turning and eliminate piston effect as it is inserted. The solder 18 in addition to cushioning the lead by absorbing stresses imparted thereto, electrically connects the lead to the lining 19 so that the lead has electrical connection with the electrode for communicating it outwardly of the body.

It should here be noted that the foregoing has the additional advantage of enabling the lead to be inserted in the body after the body is cured thus enabling leads of any desired material to be utilized since the lead will be unaffected by the curing operation. Further, the cured body, prior to insertion of the lead into the recess, may be stored for inventory, shipped or otherwise handled, thereby reducing over-all inventory and cost.

In FIGS. 4 through 7 modified forms of terminal lead connections within the concepts of the invention, are shown, all being illustrated in connection with a capacitor or electrical unit 10 of the type described in connection with FIGS. 1 to 3. In these embodiments of the invention the lead wire 19 is shown as being circular in cross-section.

In FIG. 4 a sleeve or liner 21 of electrically conductive material is disposed in the recess 16 between the electrically conductive lining 17 and the bonding material 18. The liner, which is adapted to assure reliable, mechanical and electrical connection between the electrically conductive bonding material and the lining on the wall of the recess, is positioned in the recess prior to curing the body so that the body will shrink thereon during the curing operation to grip it and retain it in position. In connection with the liner 21, it should be noted that in many cases the liner has been found necessary for assuring electrical connection between the bonding material and the electrically conductive lining on the wall of the recess since the glaze produced by the flux in the lining has a tendency to interefere with the desired electrical bond; the liner overcomes this problem and provides a readily solderable surface.

In FIG. 5 the terminal lead connection is made in the same manner as was described with respect to FIGS. 1 to 3 through the curing operation. However, at this point a non-conducting shock absorbing bonding material 22, such as any well known epoxide resin is inserted in the recess and the lead is thereafter positioned to bottom in the recess as shown at 23 for physically contacting and engaging the lining 17 on the wall of the recess. In this construction the bonding material 22 serves only to retain the lead in position and cushion it against stress, the electrical contact between the lead and the electrode being independent of the bonding material.

In FIG. 6 the terminal lead connection shown is identical to that described in FIGS. 1 to 3 except that the shock absorbing bonding material, rather than being an electrically conductive silver solder or the like, comprises an electrically conductive epoxide resin 24. The electrically conductive epoxide resin, while it may take any form known to the art, in the illustrated and preferred form of the invention comprises a suspension of silver or similar conducting particles 25 and epoxide resin.

In FIG. 7 the terminal lead connection is made by inserting a quantity of shock absorbing bonding material 26, formed of electrically conductive epoxide resin similar to that described with respect to FIG. 6, in the recess so that a portion, at least, of the wall of the recess is lined with the bonding material, it being necessary that all of the electrode plates exposed by the recess are engaged by the bonding material. Thereafter the lead 19 is inserted in the same manner as was described with respect to the other forms of the invention so that a substantial thickness of the bonding material is disposed around the lead for cushioning the same. In this form of the invention the lead 19 has electrical connection with its respective electrode of the unit through the electrically conductive epoxide resin forming the bonding cushion 26.

Thus, among others, the several objects and advantages of the invention as aforenoted are achieved. Obviously numerous changes in the structure may be resorted to without departing from the spirit of the invention as defined by the claims.

We claim:

1. In an electrical component which includes a substantially rigid monolithic body formed of substantially parallel layers of material having specific electrical properties, at least one of said layers being electrically conductive and lying wholly within said body, and a flexible terminal lead extending into said body and having electrical connection with said electrically conductive layer for electrically communicating the same outwardly of the body; the improvement wherein said terminal lead is disposed in a recess extending into said body at least to said electrically conductive layer, said recess being of substantially greater diameter than said lead so that an annular space is provided between the lead and the body, and a shock absorbing bonding material is disposed in said annular space for forming an annular cushion around said lead and bonding the same in position, said lead having electrical connection with said electrically conductive layer and said cushion increasing the effective surface area of the bond relative to the surface area of the bonded portion of the lead, whereby stress resulting from flexing of the lead is dissipated.

2. In an electrical component which includes a substantially rigid monolithic body formed of substantially parallel layers of material having specific electrical properties, at least one of said layers being electrically conductive and lying wholly within said body, and a flexible terminal lead extending into said body and having electrical connection with said electrically conductive layer for electrically communicating the same outwardly of the body; the improvement wherein said terminal lead is disposed in a recess extending into said body at least to said electrically conductive layer, said recess having a diameter approximately twice the diameter of said lead so that an annular space is provided between the lead and the body approximately equal to the radius of said lead, and a shock absorbing bonding material disposed in said annular space for forming an annular cushion around said lead and bonding the same in position, said lead having electrical connection with said electrically conductive layer and said cushion increasing the effective surface area of the bond relative to the surface area of the bonded portion of the lead, whereby stress resulting from flexing of the lead is dissipated.

3. In an electrical capacitor which comprises a substantially rigid monolithic body formed of substantially parallel layers of material having specific electrical properties, said layers including a plurality of dielectric layers and a plurality of electrically conductive layers, at least some of said electrically conductive layers lying wholly within said body, said dielectric layers separating said electrically conductive layers, means electrically connecting alternate electrically conductive layers for forming electrodes of opposite polarity, and a flexible terminal lead for each electrode extending into said body and having electrical connection with said electrical connecting means for electrically communicating its respective electrode outwardly of the body; the improvement wherein said terminal leads each are disposed in a recess extending into said body at least through said electrically conductive layers forming its respective electrode, said electrical connecting means comprising a lining on the wall of said recess, said recesses each being of substantially greater diameter than its respective lead so that an annular space is provided between said lead and the body, and a shock absorbing bonding material is disposed in said annular spaces for forming an annular cushion around said lead and bonding the same in position, said leads each having electrical connection with their respective electrical connecting means and said cushions increasing the effective surface area of the bonds relative to the surface area of the bonded portion of the leads, whereby stress resulting from flexing of the leads is dissipated.

4. A terminal lead connection to an electrically conductive element wholly embedded in a substantially rigid monolithic body comprising a flexible terminal lead wire disposed in a recess in said body extending at least into said electrically conductive element therein, said recess being of substantially greater diameter than said lead wire so that an annular space is provided between said lead wire and said body, and a shock absorbing bonding material disposed in said annular space for forming an annular cushion around said lead wire and bonding the same in position, said lead wire having electrical connection with said element and said cushion increasing the effective surface area of the bond relative to the surface area of the bonded portion of the lead wire, whereby stress resulting from flexing of the lead wire is dissipated.

5. A terminal lead connection as defined in claim 4, wherein said recess has a diameter approximately twice the diameter of said lead wire so that said annular space between the lead wire and the body is approximately equal to the radius of the lead wire.

6. The invention defined in claim 1 wherein said shock absorbing bond material comprises an electrically conductive epoxide resin and has electrical connection with said electrically conductive layer, said lead having electrical connection with said electrically conductive layer through said bonding material.

7. The invention defined in claim 3 wherein there is an electrically conductive sleeve means for each electrode positioned between said bonding material and said means for connecting alternate electrically conductive layers, said leads having electrical connection with their respective layer connecting means through said sleeve means.

References Cited by the Examiner

UNITED STATES PATENTS

| | | |
|---|---|---|
| 2,389,018 | 11/1945 | Ballard. |
| 2,413,539 | 12/1946 | Ballard _____ 339—275 X |
| 2,502,291 | 3/1950 | Taylor. |
| 3,007,997 | 11/1961 | Panariti _____ 339—17 X |
| 3,021,589 | 2/1962 | Weller _____ 317—242 X |

OTHER REFERENCES

Lorenz, E. J.: Card Reading Plate, IBM Technical Disclosure Bulletin, vol. 1, No. 3, October 1958, page 1.

LARAMIE E. ASKIN, *Primary Examiner.*

JOHN F. BURNS, *Examiner.*

D. J. BADER, *Assistant Examiner.*